United States Patent
Vandersmissen et al.

(10) Patent No.: US 12,109,864 B2
(45) Date of Patent: Oct. 8, 2024

(54) END STOP DAMPING CONTROL SYSTEMS AND METHODS

(71) Applicant: DRiV Automotive Inc., Northville, MI (US)

(72) Inventors: Bert Vandersmissen, Lovenjoel (BE); Thom Heylands, Sint-Truiden (BE); Nandish Calchand, Leuven (BE); Tom Borgers, Sint-Truiden (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/172,611

(22) Filed: Feb. 22, 2023

(65) Prior Publication Data
US 2024/0286451 A1 Aug. 29, 2024

(51) Int. Cl.
*B60G 17/08* (2006.01)
*B60G 17/015* (2006.01)
*B60G 17/016* (2006.01)

(52) U.S. Cl.
CPC ......... *B60G 17/08* (2013.01); *B60G 17/0152* (2013.01); *B60G 17/016* (2013.01); *B60G 2202/24* (2013.01); *B60G 2202/414* (2013.01); *B60G 2500/11* (2013.01); *B60G 2600/182* (2013.01)

(58) Field of Classification Search
CPC .. B60G 17/08; B60G 17/0152; B60G 17/016; B60G 2202/24; B60G 2202/414; B60G 2500/11; B60G 2600/182
See application file for complete search history.

(56) References Cited

U.S. PATENT DOCUMENTS

| | | | |
|---|---|---|---|
| 5,276,622 A | 1/1994 | Miller et al. | |
| 7,942,248 B2 | 5/2011 | St. Clair et al. | |
| 11,007,837 B2 | 5/2021 | Mohamed et al. | |
| 11,186,135 B2 | 11/2021 | Anderson et al. | |
| 2012/0319376 A1* | 12/2012 | Yu | B60G 17/0162 188/314 |
| 2017/0240017 A1 | 8/2017 | Vandersmissen et al. | |
| 2019/0203798 A1 | 7/2019 | Cox et al. | |
| 2021/0053409 A1 | 2/2021 | Kim | |
| 2021/0178850 A1* | 6/2021 | Kaldas | F16F 9/22 |
| 2021/0354523 A1 | 11/2021 | Hirao | |
| 2023/0302865 A1* | 9/2023 | Tong | B60G 17/08 |

FOREIGN PATENT DOCUMENTS

DE 102018205434 B3 6/2019

* cited by examiner

*Primary Examiner* — Toan C To
(74) *Attorney, Agent, or Firm* — Harness, Dickey & Pierce, P.L.C.

(57) ABSTRACT

A damping control system includes: a damping chamber connected to one of (a) a body of a vehicle and (b) a wheel of the vehicle; a piston that is slidably disposed within the damping chamber and that includes: a piston rod that is connected to the other one of (a) the body of the vehicle and (b) the wheel of the vehicle; and a plunger that is connected to the piston rod and that divides the damping chamber into a first chamber and a second chamber; a first valve that regulates hydraulic fluid flow out of the first chamber; and a valve control module configured to selectively close the first valve when a position of the plunger is between (a) a first reference position within the first chamber and (b) a first end stop of the damping chamber that defines a boundary of the first chamber.

20 Claims, 10 Drawing Sheets

END STOP DAMPING CONTROL SYSTEMS AND METHODS

FIELD

The present disclosure relates to control systems and methods for hydraulic dampers or shock absorbers of a suspension system of a vehicle and more particularly to systems and methods for control of dampers or shock absorbers to avoid end stop contact.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Shock absorbers are used in conjunction with vehicle suspension systems to absorb unwanted vibrations during driving. To absorb the unwanted vibrations, shock absorbers are generally connected between the sprung portion (body) of the vehicle and the unsprung portion (suspension) of the vehicle.

Vehicles may be equipped with an electrically adjustable damping system that includes an electrically adjustable hydraulic shock absorber. Such adjustable shock absorbers may include an electromechanical valve/actuator disposed therein. A main control unit disposed within the vehicle is used to control the damping state of each of the adjustable shock absorbers by controlling the actuation of the electromechanical valve.

SUMMARY

In a feature, a damping control system includes: a damping chamber connected to one of (a) a body of a vehicle and (b) a wheel of the vehicle; a piston that is slidably disposed within the damping chamber and that includes: a piston rod that is connected to the other one of (a) the body of the vehicle and (b) the wheel of the vehicle; and a plunger that is connected to the piston rod and that divides the damping chamber into a first chamber and a second chamber; a first valve that regulates hydraulic fluid flow out of the first chamber; and a valve control module configured to selectively close the first valve when a position of the plunger is between (a) a first reference position within the first chamber and (b) a first end stop of the damping chamber that defines a boundary of the first chamber.

In further features: a second valve regulates hydraulic fluid flow out of the second chamber, where the valve control module is configured to selectively close the second valve when the position of the plunger is between (a) a second reference position within the second chamber and (b) a second end stop of the damping chamber that defines a boundary of the second chamber.

In further features, the valve control module is further configured to maintain the second valve fully open when the position is not between (a) the second reference position within the second chamber and (b) the second end stop of the damping chamber that defines a boundary of the second chamber.

In further features, the valve control module is further configured to maintain the first valve fully open when the position is not between (a) the first reference position within the first chamber and (b) the first end stop of the damping chamber.

In further features, the valve control module is further configured to, when the position is between (a) the first reference position within the first chamber and (b) the first end stop of the damping chamber: determine a command for closing of the first valve based on the position; and selectively close the first valve based on the command.

In further features, the valve control module is configured to determine the command based on the position and the first reference position.

In further features, the valve control module is configured to determine the command further based on a mode of operation of a suspension system of the vehicle.

In further features: a second valve regulates hydraulic fluid flow out of the second chamber, where the valve control module is configured to: selectively close the second valve when the position of the plunger is between (a) a second reference position within the second chamber and (b) a second end stop of the damping chamber that defines a boundary of the second chamber; determine a command for closing of the first valve based on a difference between the position and the second reference position; and selectively close the first valve based on the command.

In further features, the valve control module is configured to determine the command further based on a mode of operation of a suspension system of the vehicle.

In further features, the valve control module is configured to determine the command further based on a vehicle speed.

In further features, the valve control module is configured to determine the command further based on a rate limit for decreases in the command.

In further features, the valve control module is configured to determine the rate limit based on a vehicle speed and a mode of operation of a suspension system of the vehicle.

In further features, the valve control module is configured to not rate limit increases in the command.

In further features, the valve control module is configured to increasingly close the first valve as the position of the plunger moves toward (b) the first end stop of the damping chamber and away from (a) the first reference position within the first chamber.

In a feature, a damping control method includes: selectively closing a first valve when a position of a plunger is between (a) a first reference position within a first chamber and (b) a first end stop of a damping chamber that defines a boundary of the first chamber; the damping chamber connected to one of (a) a body of a vehicle and (b) a wheel of the vehicle; a piston being slidably disposed within the damping chamber and including: a piston rod that is connected to the other one of (a) the body of the vehicle and (b) the wheel of the vehicle; and the plunger, the plunger connected to the piston rod and dividing the damping chamber into a first chamber and a second chamber; and the first valve regulating hydraulic fluid flow out of the first chamber; and selectively closing a second valve when the position of the plunger is between (a) a second reference position within the second chamber and (b) a second end stop of the damping chamber that defines a boundary of the second chamber, the second valve regulating hydraulic fluid flow out of the second chamber.

In further features, the damping control method further includes maintaining the second valve fully open when the position is not between (a) the second reference position within the second chamber and (b) the second end stop of the damping chamber that defines a boundary of the second chamber.

In further features, the damping control method further includes maintaining the first valve fully open when the position is not between (a) the first reference position within the first chamber and (b) the first end stop of the damping chamber.

In further features, the damping control method further includes, when the position is between (a) the first reference position within the first chamber and (b) the first end stop of the damping chamber: determining a command for closing of the first valve based on the position; and selectively closing the first valve based on the command.

In further features, the damping control method further includes the command based on the position and the first reference position.

In a feature, a damping control method includes: selectively closing a first valve when a position of a plunger is between (a) a first reference position within a first chamber and (b) a first end stop of a damping chamber that defines a boundary of the first chamber; the damping chamber connected to one of (a) a body of a vehicle and (b) a wheel of the vehicle; a piston being slidably disposed within the damping chamber and including: a piston rod that is connected to the other one of (a) the body of the vehicle and (b) the wheel of the vehicle; and the plunger, the plunger connected to the piston rod and dividing the damping chamber into a first chamber and a second chamber; and the first valve regulating hydraulic fluid flow out of the first chamber; and when the position is between (a) the first reference position within the first chamber and (b) the first end stop of the damping chamber: determining a command for closing of the first valve based on the position; and selectively closing the first valve based on the command.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Dampers include a damping chamber with end stops. A piston slides within the damping chamber and divides the damping chamber into first and second damping chambers.

Road irregularities could cause the piston to contact an end stop of the damping chamber. Examples of road irregularities include pot holes, speed bumps, sidewalks, etc. Contact between the piston and an end stop can cause discomfort within the passenger cabin of the vehicle, unwanted body motion, noise, and/or damage the damper.

The present application involves controlling one or more damper valves to prevent contact between the piston and the end stops. A valve control module closes a valve and restricts hydraulic fluid flow out of a damping chamber when the piston becomes within a predetermined distance of an end stop. This increases a damping coefficient and prevents the piston from contacting the end stop.

Figure 1:
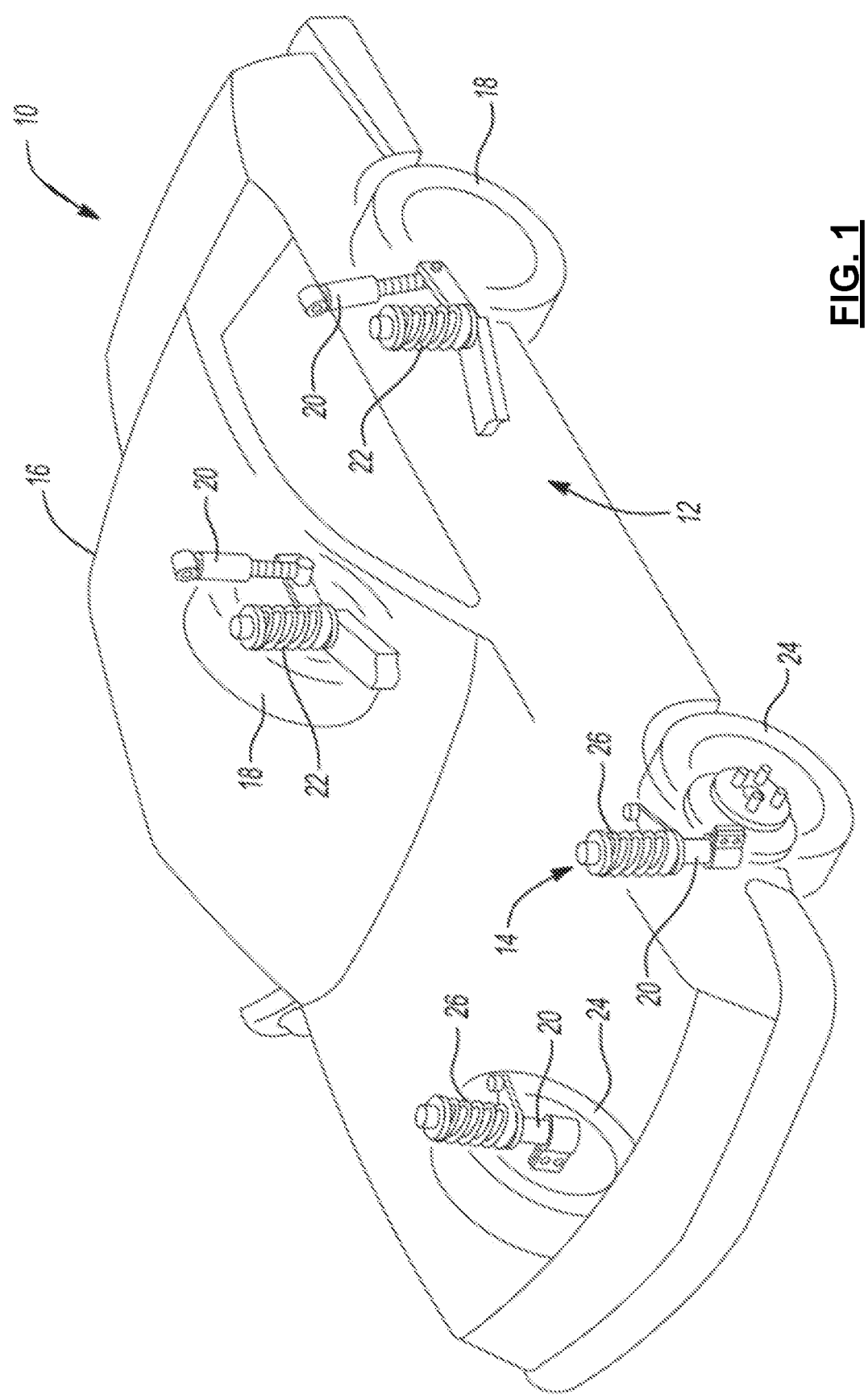
FIG. 1 is an illustration of a vehicle having a damper system which includes electrically adjustable hydraulic dampers.

FIG. 1 includes an example of a vehicle 10 incorporating a suspension system having dampers. The vehicle 10 includes a rear suspension 12, a front suspension 14, and a body 16. The rear suspension 12 has a transversely extending rear axle assembly (not shown) adapted to operatively support a pair of rear wheels 18. The rear axle assembly is attached to the body 16 via a pair of damper systems 20 and by a pair of springs 22. Similarly, the front suspension 14 includes a transversely extending front axle assembly (not shown) to operatively support a pair of front wheels 24. The front axle assembly is attached to the body 16 via of a pair of the damper systems 20 and by a pair of springs 26.

The damper systems 20 serve to dampen the relative motion of the unsprung portion (i.e., the front and rear suspensions 12, 14) with respect to the sprung portion (i.e., the body 16) of the vehicle 10. While the vehicle 10 has been depicted as a passenger car having front and rear axle assemblies, the damper system 20 may be used with other types of vehicles or in other types of applications including, but not limited to, vehicles incorporating non-independent front and/or non-independent rear suspensions, vehicles incorporating independent front and/or independent rear suspensions or other suspension systems known in the art. In addition, the damper system 20 may also be used on all wheeled and/or tracked vehicles. For example the damper system 20 may be used on two and/or three wheels type of vehicles, such as motorcycles and all-terrain vehicles. The damper system 20 can also be used in conjunction with a steering system of a vehicle to damp relative motion between two steering wheels. The damper systems also be referred to more simply as dampers.

Figure 2:
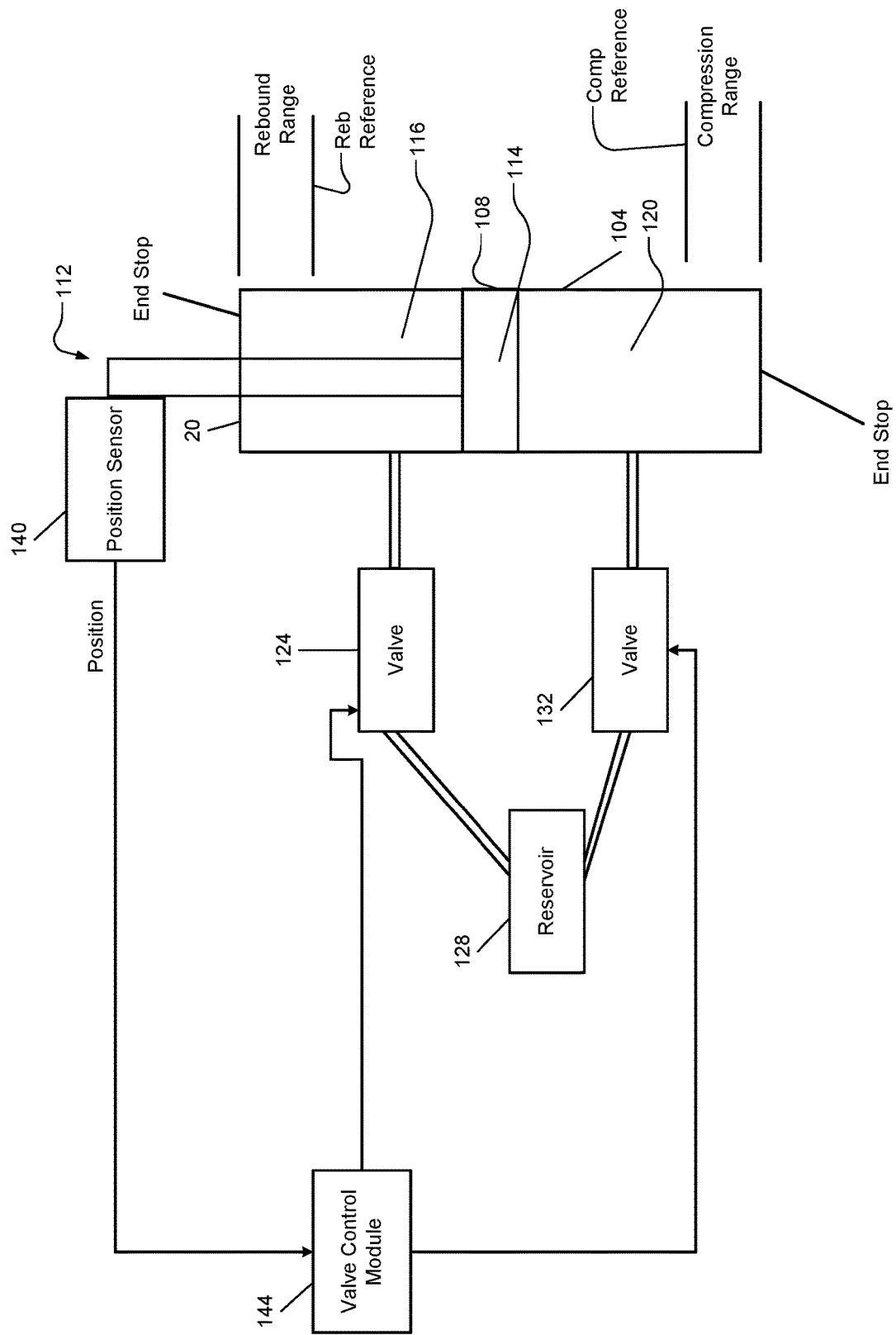
FIG. 2 is a functional block diagram of an example implementation of a damper control system.

FIG. 2 is a functional block diagram of an example implementation of a damper control system. The damper 20 includes a damping chamber 104 and a piston 108. The piston 108 moves (in the example shown vertically) within the damping chamber 104. The piston 108 includes a first end 112 that is fixed (e.g., bolted) to one of (a) the body of the vehicle and (b) the wheel of the vehicle. The damping chamber 104 is fixed (e.g., bolted) to the other one of (a) the body of the vehicle and (b) the wheel of the vehicle.

Hydraulic fluid is disposed within the damping chamber 104. The piston 108 (e.g., a plunger 114 of the piston 108) divides the damping chamber 104 into a first damping chamber portion 116 and a second damping chamber portion 120. The plunger 114 fluidly seals the first damping chamber portion 116 from the second damping chamber portion 120. The piston 108 slides within the damping chamber 104 as the body of the vehicle moves vertically and/or the wheel moves vertically. In the example of FIG. 2, vertical movement of the body of the vehicle moves the piston 108 vertically. Vertical movement of the wheel moves the damping chamber 104 vertically. In dampers with 2 controllable valves, the plunger seals between the first and second damper chambers. However in dampers with only 1 controllable valve, there may be some flow through the plunger.

Movement of the piston 108 vertically upward (without vertical movement of the damping chamber 104) compresses the hydraulic fluid in the first damping chamber portion 116. Movement of the piston 108 vertically downwardly (without vertical movement of the damping chamber 104) compresses the hydraulic fluid in the second damping chamber portion 120. Movement of the damping chamber 104 vertically upward (without vertical movement of the piston 108) compresses the hydraulic fluid in the second damping chamber portion 120. Movement of the damping chamber 104 vertically downwardly (without vertical movement of the piston 108) compresses the hydraulic fluid in the first damping chamber portion 116.

In the example of FIG. 2, a valve 124 regulates hydraulic fluid flow between the first damping chamber portion 116 and a reservoir 128. For example, closing of the valve 124 while the piston 108 is moving vertically upwardly may increasing a damping coefficient of the damper 20 by allowing the hydraulic pressure to be compressed within the first damping chamber portion 116 instead of more easily flowing to the reservoir 128 via the valve 124. A valve 132 regulates hydraulic fluid flow between the second damping chamber portion 120 and the reservoir 128. For example, closing of the valve 124 while the piston 108 is moving vertically downwardly may increasing the damping coefficient of the damper 20 by allowing the hydraulic pressure to be compressed within the second damping chamber portion 120 instead of more easily flowing to the reservoir 128 via the valve 132.

Figure 3:
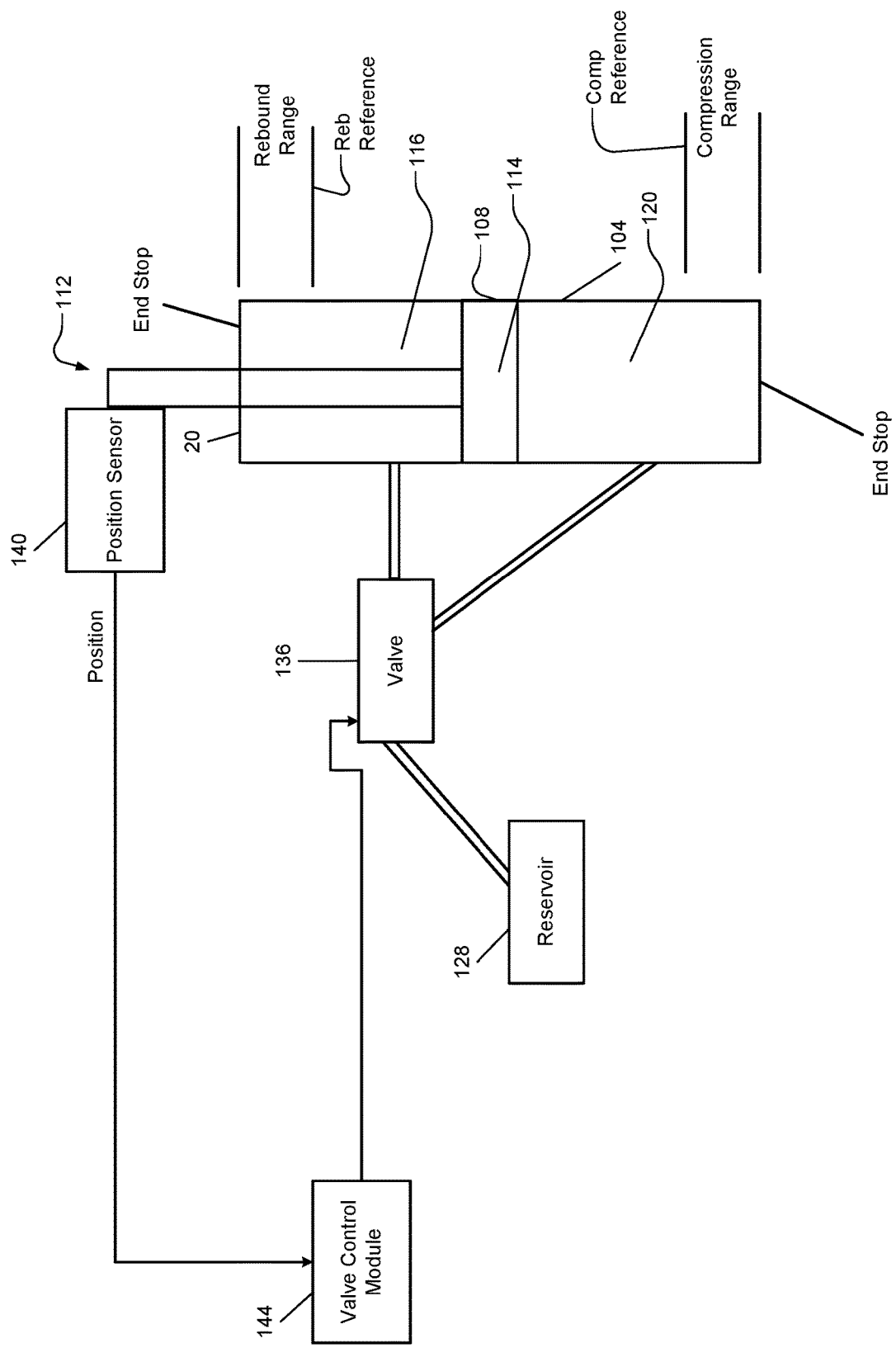
FIG. 3 is a functional block diagram of an example implementation of a damper control system.

FIG. 3 is a functional block diagram of an example implementation of a damper control system. In the example of FIG. 3, single valve 136 may regulate both (a) hydraulic fluid flow between the second damping chamber portion 120 and the reservoir 128 and (b) hydraulic fluid flow between the first damping chamber portion 116 and the reservoir 128.

The damping chamber 104 includes two end stops: one end stop at each vertical end of the damping chamber 104. The end stops are labeled End Stop in FIGS. 2 and 3. The plunger 114 contacting an end stop may result in the feeling of a harsh feeling within the vehicle and may cause damage to the damper 20.

A position sensor 140 measures a vertical position of the plunger 114 within the damping chamber 104. The position of the plunger 114 is physically limited to between the two end stops, but the plunger 114 may move between the end stops as discussed above. While an example location of the position sensor 140 is provided, the position sensor 140 may not be mounted on the damper itself. Instead, the position sensor 130 may be mounted in the suspension, such as between one of the suspension arms and the vehicle body. The measured suspension displacement is then calibrated or recalculated to damper displacement.

A rebound range of positions is defined as a predetermined distance (or range of positions) from the vertically upper one of the end stops toward the vertically lower one of the end stops. A compression range of positions is defined as a predetermined distance (or range of positions) from the vertically lower one of the end stops toward the vertically upper one of the end stops. The predetermined distances may be the same or different and may be, for example, 15% of the total range of possible positions of the plunger 114 or another suitable value.

A valve control module 144 controls opening of the valves 124 and 132 based on the position measured by the position sensor 140 based on preventing the plunger 114 from contacting either of the end stops. In the example of FIG. 3, the valve control module 144 controls opening of the valve 136 based on the position measured by the position sensor 140 based on preventing the plunger 114 from contacting either of the end stops.

Generally speaking, the valve control module 144 may maintain the valves 124 and 132 (or 136 in the example of FIG. 3) fully open when the position of the plunger 114 is not within the compression range or the rebound range. The valve control module 144, however, selectively closes a valve to restrict hydraulic fluid flow out of a damping chamber portion when the plunger 114 is within one of the compression range and the rebound range. In the example of FIG. 2, the valve control module 144 closes the valve 124 to restrict hydraulic fluid flow out of the first damping chamber portion 116 when the position of the plunger 114 is within the rebound range. The valve control module 144 closes the valve 132 to restrict hydraulic fluid flow out of the second damping chamber portion 120 when the position of the plunger 114 is within the compression range. In the example of FIG. 3, the valve control module 144 actuates the valve 136 and restricts hydraulic fluid flow out of the first damping chamber portion 116 when the position of the plunger 114 is within the rebound range. The valve control module 144 actuates the valve 136 and restricts hydraulic fluid flow out of the second damping chamber portion 120 when the position of the plunger 114 is within the compression range. This helps minimize a risk of the plunger 114 contacting an end stop.

Figure 4:
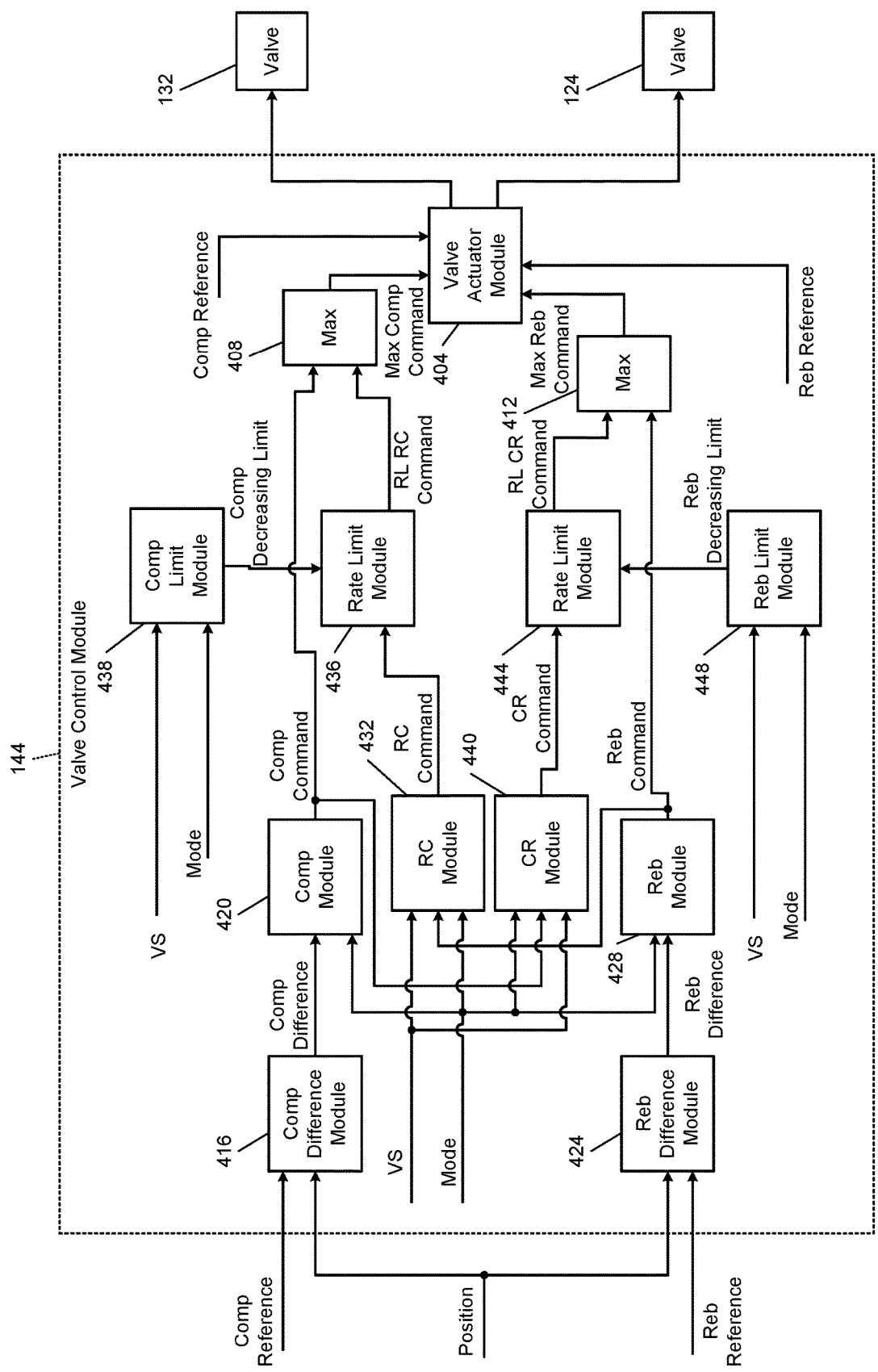
FIG. 4 is a functional block diagram of an example valve control system including an example implementation of a valve control module.

FIG. 4 is a functional block diagram of an example valve control system including an example implementation of the valve control module 144. A valve actuator module 404 actuates the valves 132 and 124. In the example of FIG. 3, the valve actuator module 404 actuates the valve 136 to perform the functions of the valves 132 and 124.

The valves 124 and 132 may be current controlled valves, and the valve actuator module 404 may control current to the valves 124 and 132. The valve 124 may be fully open when zero current is applied, and the valve 132 may be fully open when zero current is applied. While the example of current control is provided, the valves 124 and 132 may be controlled in another suitable manner.

When the position of the plunger 114 is between a compression range reference position (Comp Reference) and a rebound range reference position (Reb Reference), the valve actuator module 404 may fully open the valves 124 and 132. The position of the plunger 114 is measured by the position sensor 140. The compression range reference position is a boundary of the compression range. The end stop position is the other boundary of the compression range. An example of the compression range reference position is illustrated in FIGS. 2 and 3. The rebound range reference position is a boundary of the reference range. The end stop position is the other boundary of the rebound range. An example of the rebound range reference position is illustrated in FIGS. 2 and 3.

When the position of the plunger 114 is within the compression range, the valve actuator module 404 closes the valve 132 and restricts hydraulic fluid flow out of the second damping chamber portion 120 based on a maximum compression command (Max Comp Command). A maximum module 408 sets the maximum compression command to a maximum (greater) one of a compression command (Comp command) and a rate limited (RL) rebound compression (RC) command (RL RC Command). Discussion of the determination of the compression command and the rate limited rebound compression command is discussed below.

When the position of the plunger 114 is within the rebound range, the valve actuator module 404 closes the valve 124 and restricts hydraulic fluid flow out of the first damping chamber portion 116 based on a maximum rebound command (Max Reb Command). A maximum module 412 sets the maximum rebound command to a maximum (greater) one of a rebound command (Reb command) and a rate limited (RL) compression rebound (CR) command (RL CR Command). Discussion of the determination of the rebound command and the rate limited compression rebound command is discussed below.

A compression difference module 416 determines a compression difference (Comp difference) based on a mathematical difference between the position of the plunger 114 and the compression range reference position. The compression difference increases as the position of the plunger 114 moves past the compression range reference position and toward the end stop position of the compression range.

A compression (Comp) module 420 sets the compression command for the valve 132 based on the compression difference. The compression module 420 may set the compression command further based on a compression velocity of the plunger 114. The compression module 420 may set the compression command further based on a present mode of operation of the suspension system of the vehicle. Example modes may be, for example, sport, normal, eco, touring, and/or one or more other suitable modes. The mode may be set based on user input to one or more input devices of the vehicle. Generally speaking, the compression module 420 may increase the compression command as the compression difference increases and vice versa. The compression module 420 may set the compression command using one of an equation and a lookup table that relates compression differences (and optionally compression velocities) and modes to compression commands.

Figure 5:
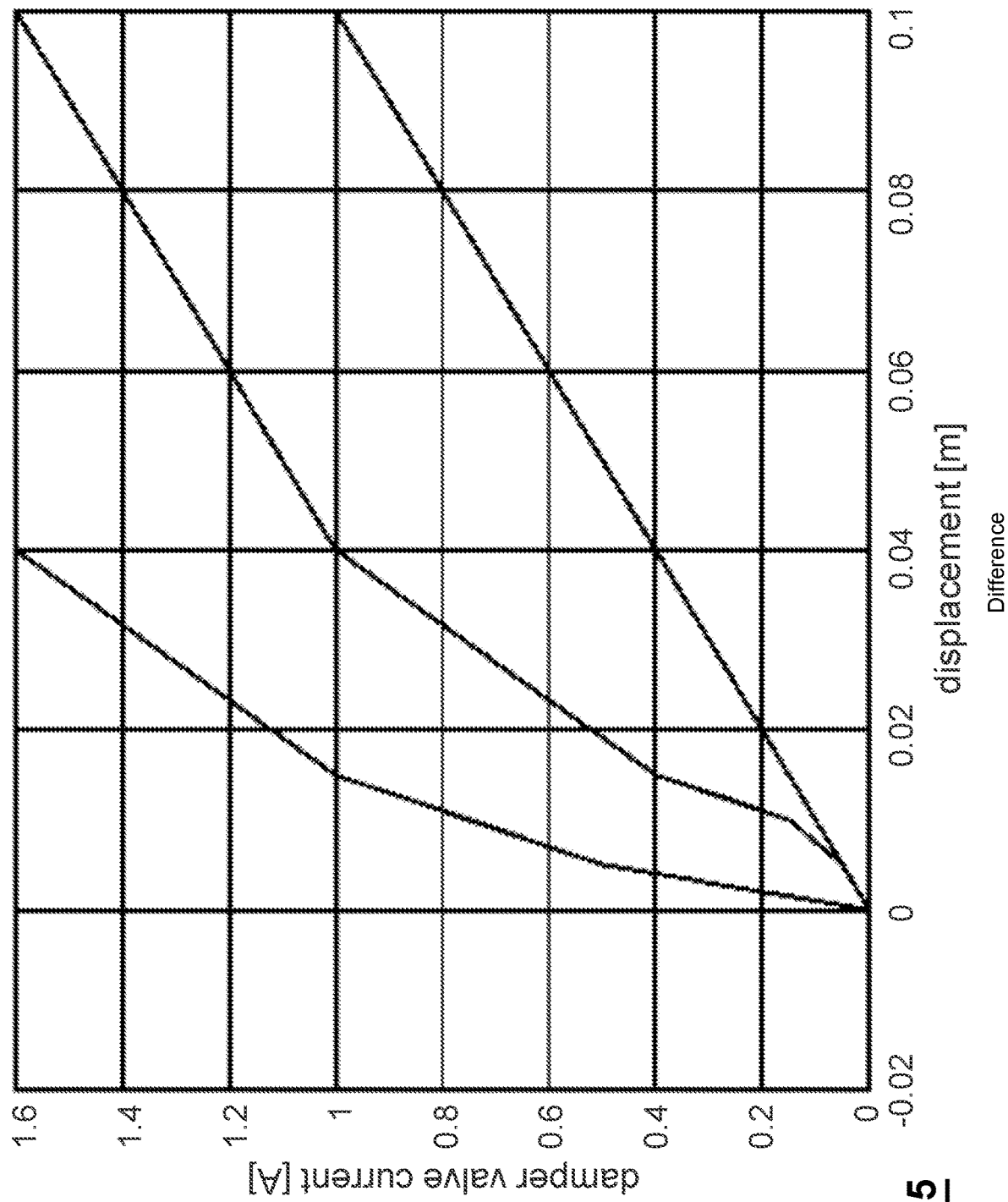
FIG. 5 includes an example graph of compression current commands as a function of compression difference.

FIG. 5 includes an example graph of compression current commands as a function of compression difference. The traces are for different modes of operation of the suspension system. The compression difference module 416 sets the compression difference to zero when the position of the plunger 114 is outside of the compression range. As illustrated, the compression module 420 increases the compression command (corresponding to increased closing of the valve 132) as the compression difference increases (i.e., as the plunger 114 approaches the compression range end stop).

A rebound difference module 424 determines a rebound difference (Reb difference) based on a mathematical difference between the position of the plunger 114 and the rebound range reference position. The rebound difference increases as the position of the plunger 114 moves past the rebound range reference position and toward the end stop position of the rebound range.

A rebound (Reb) module 428 sets the rebound command for the valve 124 based on the compression difference. The rebound module 428 may set the rebound command further based on a rebound velocity of the plunger 114. The rebound module 428 may set the rebound command further based on the present mode of operation of the suspension system of the vehicle. Generally speaking, the rebound module 428 may increase the rebound command as the rebound difference increases and vice versa. The rebound module 428 may set the rebound command using one or more equations and/or lookup tables that relate rebound differences (and optionally rebound velocities) and modes to rebound commands.

While the example of FIG. 5 includes an example graph of compression current commands as a function of compression difference, the same or similar graph may be applicable to rebound current commands as a function of rebound difference. The rebound difference module 424 sets the rebound difference to zero when the position of the plunger 114 is outside of the rebound range. As illustrated, the rebound module 428 increases the rebound command (corresponding to increased closing of the valve 124) as the rebound difference increases (i.e., as the plunger 114 approaches the rebound range end stop).

After the plunger 114 moves into the compression range, the plunger 114 may move into the rebound range before later settling back into between the compression and rebound ranges. To counteract such movement into the rebound range, a rebound compression (RC) module 432 determines an RC command based on the rebound command and a RC gain (value). The RC command is set to counteract the compression phase after a rebound event. The RC module 432 sets the RC gain based on the mode and a present vehicle speed (VS). The present vehicle speed may be determined, for example, based on one or more wheel speeds. The RC module 432 may set the RC command, for example, based on or equal to the compression command multiplied by the RC gain. The RC module 432 may set the RC gain using one or more equations and/or mappings that relate modes and vehicle speeds to RC gains.

Figure 6:
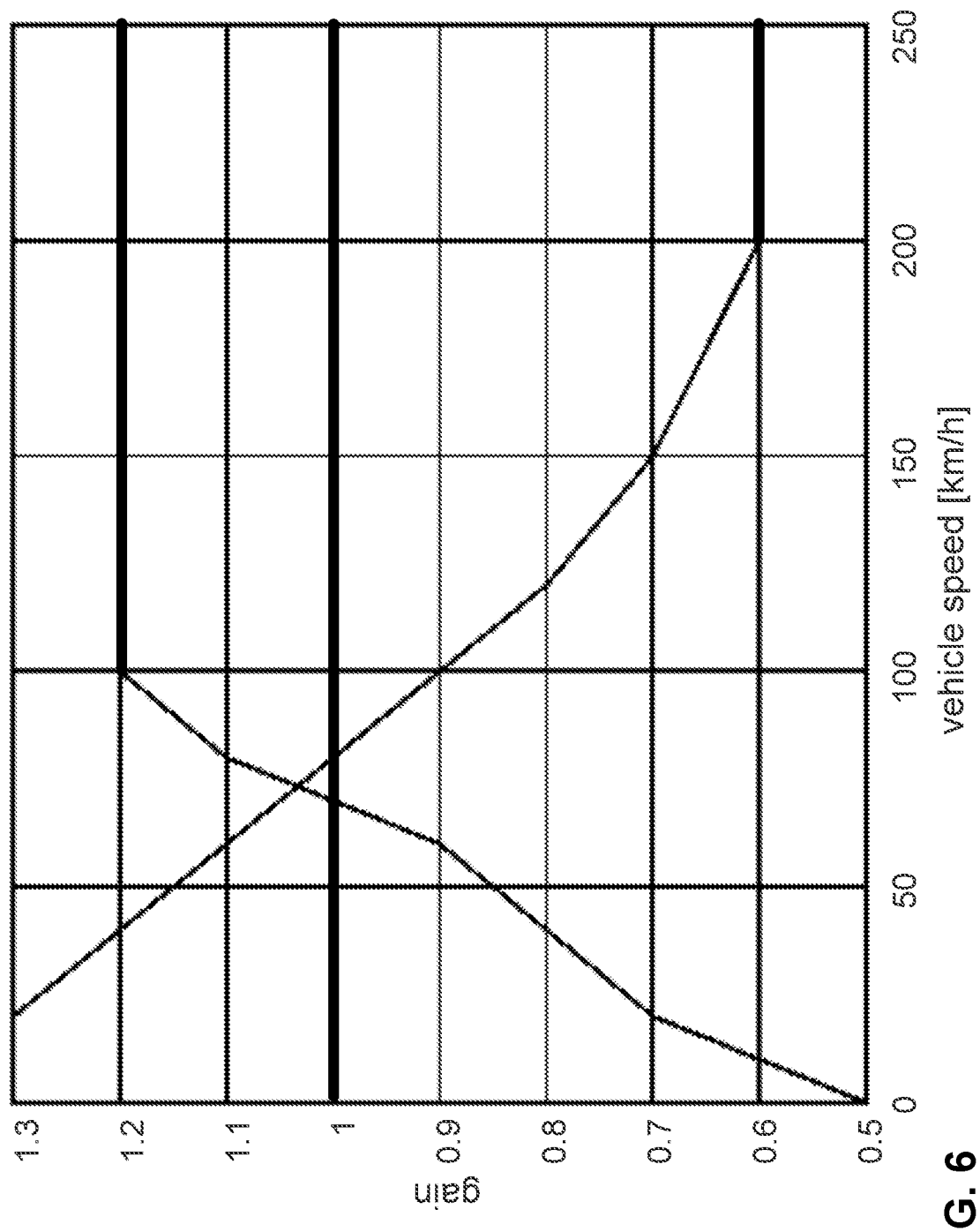
FIG. 6 includes an example graph of gains as a function of vehicle speed.

FIG. 6 includes an example graph of RC gains as a function of vehicle speed. The traces are for different modes of operation of the suspension system.

A rate limit (RL) module 436 rate limits decreases in the RC command to a compression (Comp) decreasing limit to generate the RL RC command discussed above. In other words, the RL module 436 may allow the RC command to decrease by only up to the compression decreasing limit per predetermined period when setting the RL RC command. For example, if the RC command decreases (relative to a last RC command) by more than the compression decreasing limit, the RL module 436 sets the RL RC command to the last RC command minus the compression decreasing limit. If the RC command decreases by less than or equal to the compression decreasing limit, the RL module 436 sets the RL RC command to the RC command.

Increases in the RC command may not be limited by the RL module 436. This may be to allow responses to counteract the motion to be made as quickly as possible to minimize a possibility of contact with the end stop.

A compression limit module 438 sets the compression decreasing limit based on the present VS and the mode of operation of the suspension system. The compression limit module 438 may set the compression decreasing limit, for example, using one or more equations and/or lookup tables that relate vehicle speeds and modes to compression decreasing limits.

Figure 7:
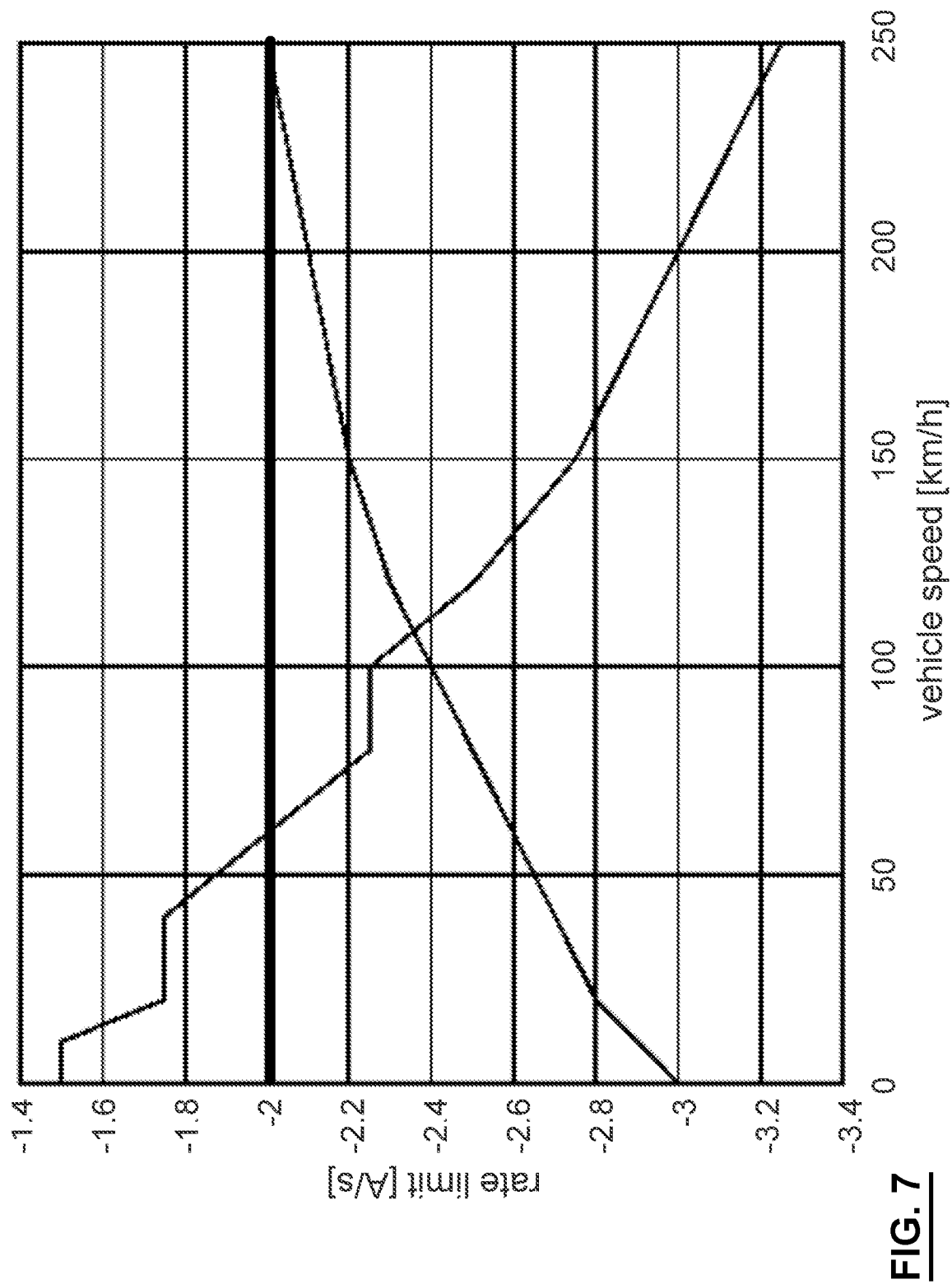
FIG. 7 includes an example graph of compression decreasing limits as a function of vehicle speed.

FIG. 7 includes an example graph of compression decreasing limits as a function of vehicle speed. The traces are for different modes of operation of the suspension system.

Similarly to rebound then compression movement, after the plunger 114 moves into the rebound range, the plunger 114 may move into the compression range before later settling back into between the compression and rebound ranges. To counteract such movement into the compression range, a compression rebound (CR) module 440 determines a CR command based on the compression command and a CR gain (value). The CR command is set to counteract the rebound phase after a compression event. The CR module 440 sets the CR gain based on the mode and the present vehicle speed (VS). The CR module 440 may set the CR command, for example, based on or equal to the rebound command multiplied by the CR gain. The CR module 440 may set the CR gain using one or more equations and/or mappings that relate modes and vehicle speeds to CR gains.

While the example of FIG. 6 includes an example graph of RC gains as a function of vehicle speed for different modes of operation of the suspension system, the same or similar graph may be applicable to CR gains as a function of vehicle speed and mode of operation.

A rate limit (RL) module 444 rate limits decreases in the CR command to a rebound (Reb) decreasing limit to generate the RL CR command discussed above. In other words, the RL module 444 may allow the CR command to decrease by only up to the rebound decreasing limit per predetermined period when setting the RL CR command. For example, if the CR command decreases (relative to a last CR command) by more than the rebound decreasing limit, the RL module 444 sets the RL CR command to the last CR command minus the rebound decreasing limit. If the CR command decreases by less than or equal to the rebound decreasing limit, the RL module 444 sets the RL CR command to the CR command.

A rebound limit module 448 sets the rebound decreasing limit based on the present VS and the mode of operation of the suspension system. The rebound limit module 448 may set the rebound decreasing limit, for example, using one or more equations and/or lookup tables that relate vehicle speeds and modes to compression decreasing limits.

While the example of FIG. 7 includes an example graph of compression decreasing limits as a function of vehicle speed for different modes of operation of the suspension system, the same or similar graph may be applicable to rebound decreasing limits as a function of vehicle speed and mode of operation. The valve actuator module 404 closes the valve(s) based on the maximum compression and rebound commands as described above to prevent contacting the end stops.

Figure 8A:
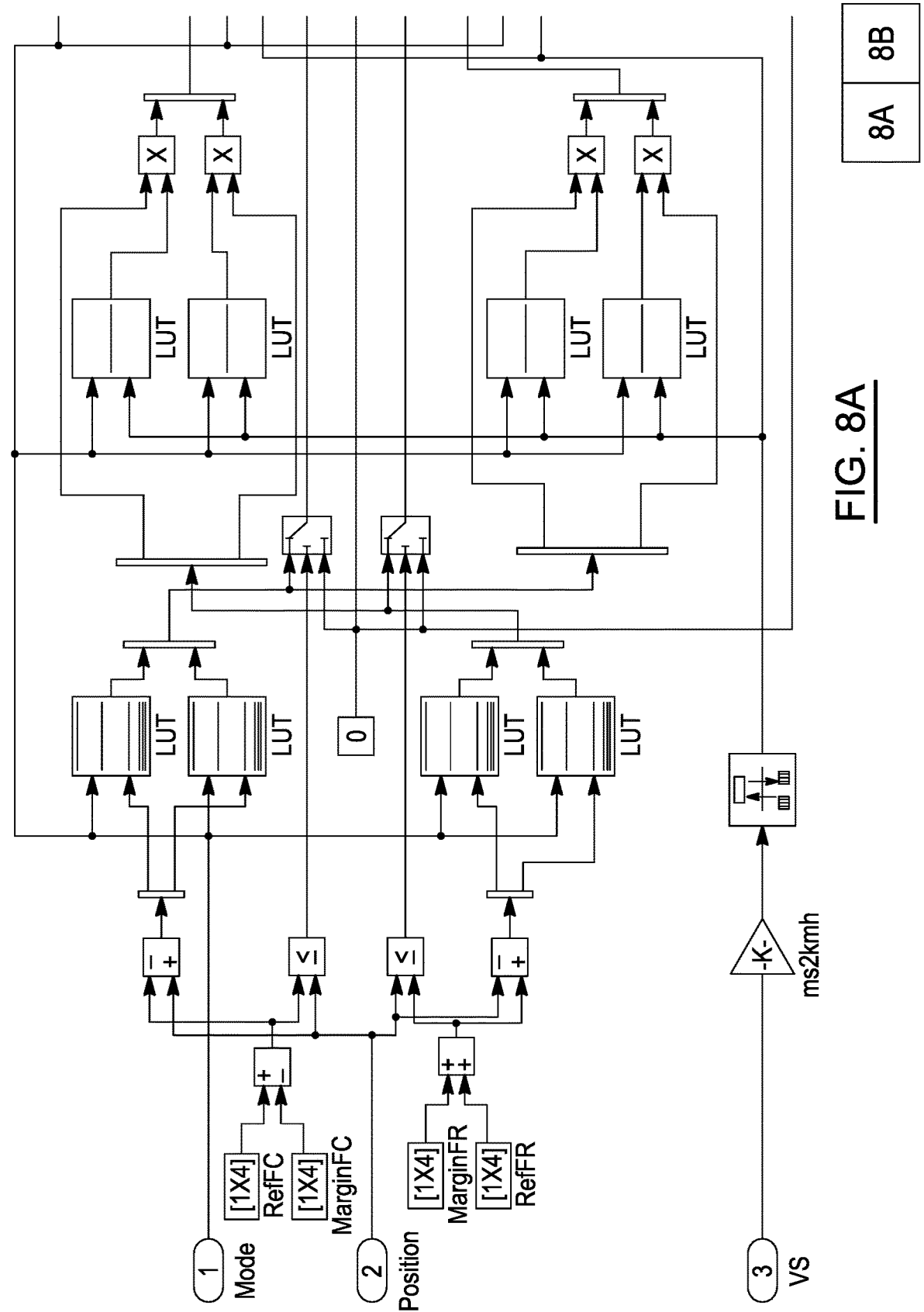
FIGS. 8A and 8B together include an example functional block diagram for providing the functionality described herein.
Figure 8B:
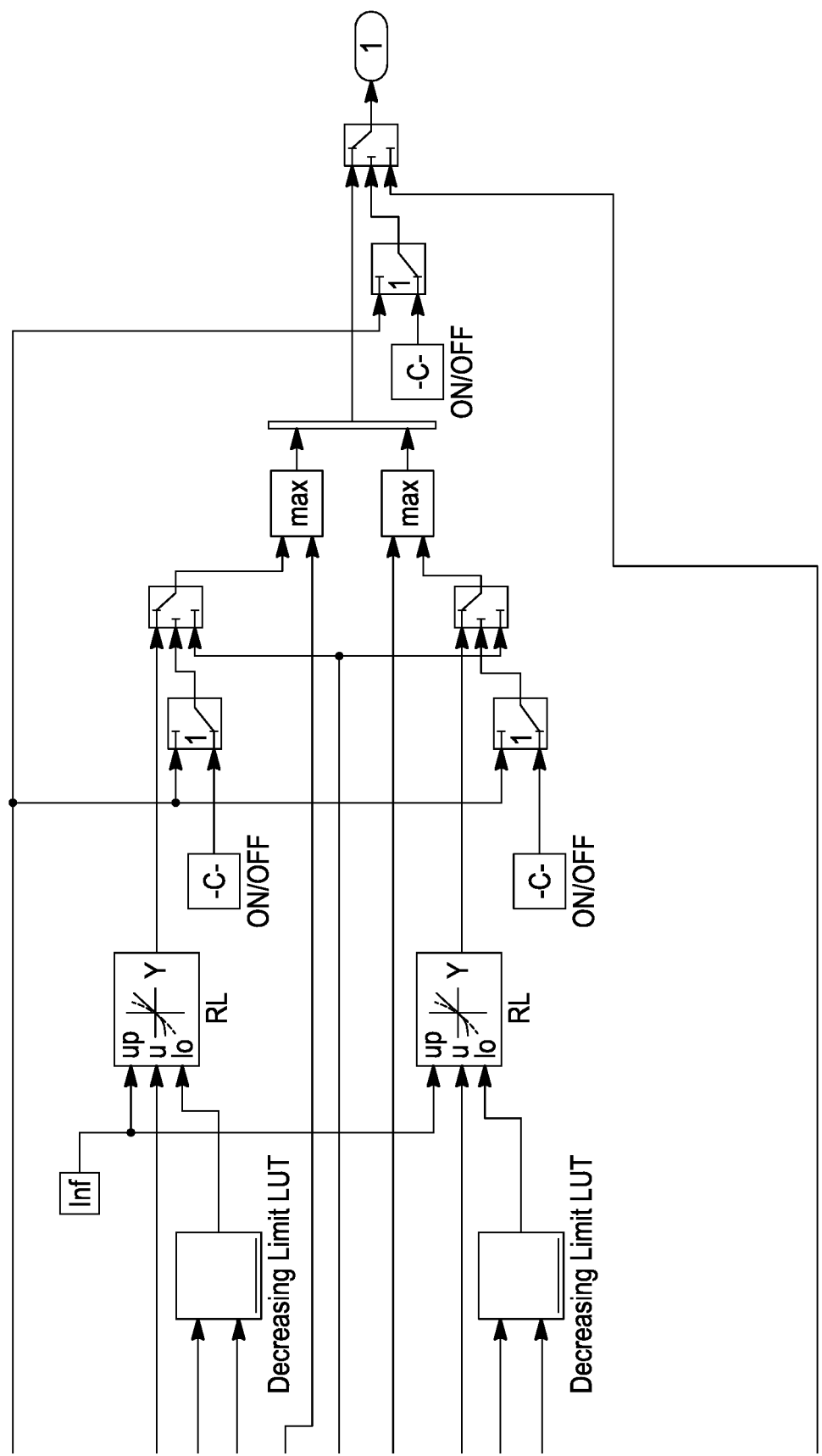

FIGS. 8A and 8B together include an example functional block diagram illustrated using Simulink blocks for providing the functionality described above.

Figure 9:
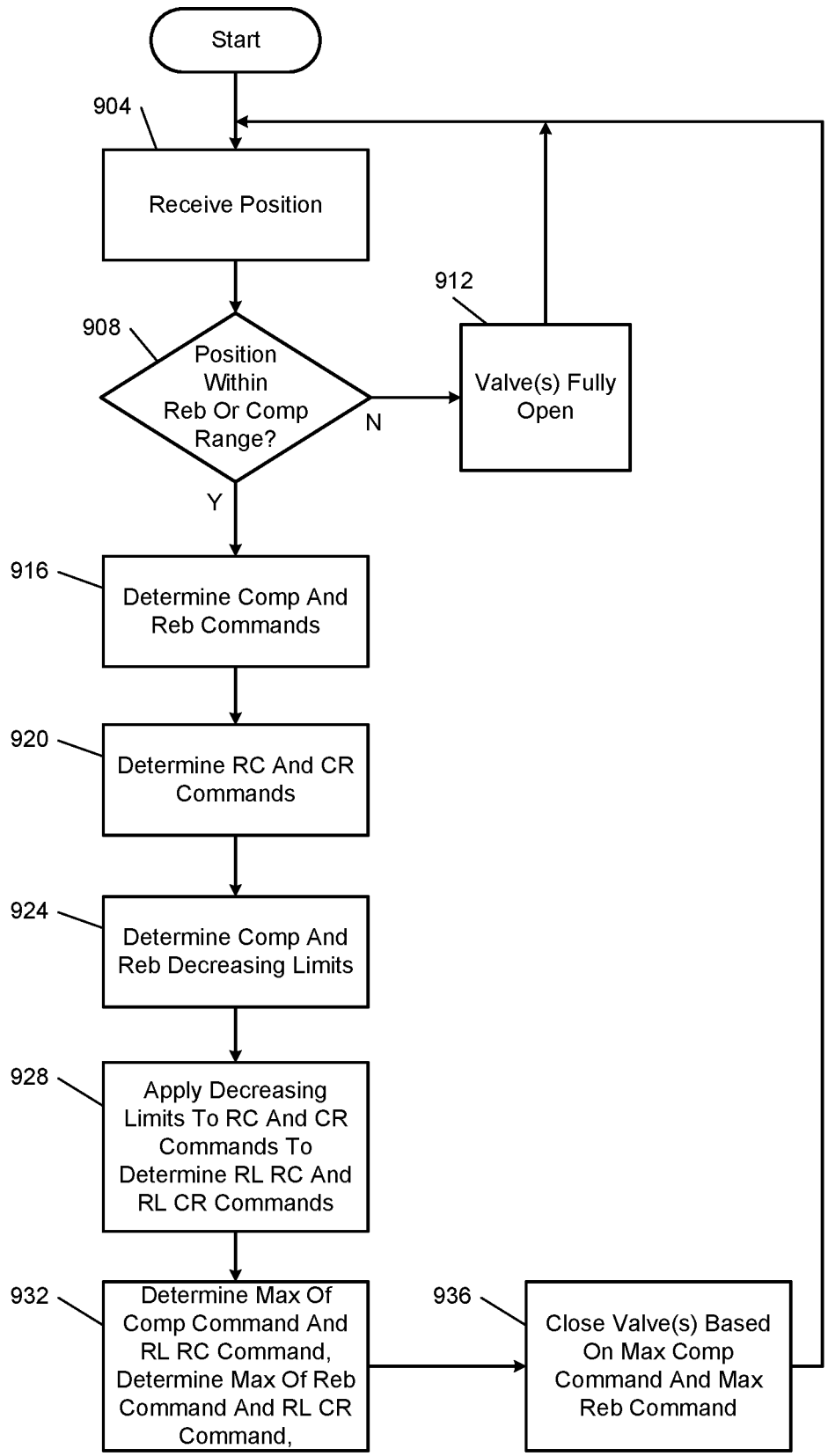
FIG. 9 is a flowchart depicting an example method of controlling one or more damper valves to prevent end stop contact.

FIG. 9 is a flowchart depicting an example method of controlling the valve(s) to prevent end stop contact. Control begins with 904 where the valve control module 144 receives the (present) position of the plunger 114 from the position sensor 140. At 908, the valve actuator module 404 determines whether the position is within the rebound range or the compression range. If 908 is false, the valve actuator module 404 may fully open the valve(s) (124 and 132 or 136) at 912, and control may return to 904.

At 916, the compression difference module 416 determines the compression difference, and the rebound difference module 424 determines the rebound difference, as described above. Also at 916, the compression module 420 determines the compression command based on the compression difference and the mode of operation of the suspension. The rebound module 428 determines the rebound command based on the rebound difference and the mode of operation of the suspension.

At 920, the RC module 432 determines the RC command based on the rebound command, the mode, and the vehicle speed as described above. Also, the CR module 440 determines the CR command based on the compression command, the mode, and the vehicle speed as described above.

At 924, the compression limit module 438 determines the compression decreasing limit based on the vehicle speed and the mode. The rebound limit module 448 also determines the rebound decreasing limit based on the vehicle speed and the mode.

At 928, the rate limit modules 436 and 444 apply the compression and rebound decreasing rate limits to the RC and CR commands, respectively, to limit decreases in the RC and CR commands. For example, if the RC command (determined at 920) is less than the last RC command (from the last iteration of 920) by more than the compression decreasing limit, the rate limit module 436 sets the RL RC command to the last RC command minus the compression decreasing limit. If the RC command is less than the last RC command by less than or equal to the compression decreasing limit, the rate limit module 436 sets the RL RC command to the RC command from 920. The rate limit module 436 does not rate limit increases in the RC command. As such, if the RC command is greater than the last RC command, the rate limit module 436 sets the RL RC command equal to the RC command. If the CR command (determined at 920) is less than the last CR command (from the last iteration of 920) by more than the rebound decreasing limit, the rate limit module 444 sets the RL CR command to the last CR command minus the rebound decreasing limit. If the CR command is less than the last CR command by less than or equal to the rebound decreasing limit, the rate limit module 444 sets the RL CR command to the CR command from 920. The rate limit module 444 does not rate limit increases in the CR command. As such, if the CR command is greater than the last CR command, the rate limit module 444 sets the RL CR command equal to the CR command.

At 932, the maximum module 408 sets the maximum compression command to the maximum (greater) one of the compression command and the RL RC command. The maximum module 412 also sets the maximum rebound command to the maximum (greater) one of the rebound command and the RL CR command. At 936, the valve actuator module 404 closes the valve(s) based on the maximum compression and rebound commands. For example, the valve actuator module 404 closes the valves 132 and 124 based on the maximum compression and rebound commands, respectively, in the example of FIG. 2. The valve actuator module 404 closes the valve 136 from the second and first damping chambers 120 and 116 based on the maximum compression and rebound commands, respectively, in the example of FIG. 3. Control returns to 904 for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, JavaQ, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A damping control system comprising:
a damping chamber connected to one of (a) a body of a vehicle and (b) a wheel of the vehicle;
a piston that is slidably disposed within the damping chamber and that includes:
   a piston rod that is connected to the other one of (a) the body of the vehicle and (b) the wheel of the vehicle; and
   a plunger that is connected to the piston rod and that divides the damping chamber into a first chamber and a second chamber;
a first valve that regulates hydraulic fluid flow out of the first chamber; and
a valve control module configured to selectively close the first valve when a position of the plunger is between (a) a first reference position within the first chamber and (b) a first end stop of the damping chamber that defines a boundary of the first chamber.

2. The damping control system of claim 1 further comprising:
a second valve that regulates hydraulic fluid flow out of the second chamber,
wherein the valve control module is configured to selectively close the second valve when the position of the plunger is between (a) a second reference position within the second chamber and (b) a second end stop of the damping chamber that defines a boundary of the second chamber.

3. The damping control system of claim 2 wherein the valve control module is further configured to maintain the second valve fully open when the position is not between (a) the second reference position within the second chamber and (b) the second end stop of the damping chamber that defines a boundary of the second chamber.

4. The damping control system of claim 1 wherein the valve control module is further configured to maintain the first valve fully open when the position is not between (a) the first reference position within the first chamber and (b) the first end stop of the damping chamber.

5. The damping control system of claim 1 wherein the valve control module is further configured to, when the position is between (a) the first reference position within the first chamber and (b) the first end stop of the damping chamber:
determine a command for closing of the first valve based on the position; and
selectively close the first valve based on the command.

6. The damping control system of claim 5 wherein the valve control module is configured to determine the command based on the position and the first reference position.

7. The damping control system of claim 5 wherein the valve control module is configured to determine the command further based on a mode of operation of a suspension system of the vehicle.

8. The damping control system of claim 1 further comprising:
a second valve that regulates hydraulic fluid flow out of the second chamber,
wherein the valve control module is configured to:
selectively close the second valve when the position of the plunger is between (a) a second reference position within the second chamber and (b) a second end stop of the damping chamber that defines a boundary of the second chamber;
determine a command for closing of the first valve based on a difference between the position and the second reference position; and
selectively close the first valve based on the command.

9. The damping control system of claim 8 wherein the valve control module is configured to determine the command further based on a mode of operation of a suspension system of the vehicle.

10. The damping control system of claim 8 wherein the valve control module is configured to determine the command further based on a vehicle speed.

11. The damping control system of claim 8 wherein the valve control module is configured to determine the command further based on a rate limit for decreases in the command.

12. The damping control system of claim 11 wherein the valve control module is configured to determine the rate limit based on a vehicle speed and a mode of operation of a suspension system of the vehicle.

13. The damping control system of claim 11 wherein the valve control module is configured to not rate limit increases in the command.

14. The damping control system of claim 1 wherein the valve control module is configured to increasingly close the first valve as the position of the plunger moves toward (b) the first end stop of the damping chamber and away from (a) the first reference position within the first chamber.

15. A damping control method comprising:
selectively closing a first valve when a position of a plunger is between (a) a first reference position within a first chamber and (b) a first end stop of a damping chamber that defines a boundary of the first chamber;
the damping chamber connected to one of (a) a body of a vehicle and (b) a wheel of the vehicle;
a piston being slidably disposed within the damping chamber and including:
   a piston rod that is connected to the other one of (a) the body of the vehicle and (b) the wheel of the vehicle; and
   the plunger, the plunger connected to the piston rod and dividing the damping chamber into a first chamber and a second chamber; and
the first valve regulating hydraulic fluid flow out of the first chamber; and
selectively closing a second valve when the position of the plunger is between (a) a second reference position within the second chamber and (b) a second end stop of the damping chamber that defines a boundary of the second chamber,
the second valve regulating hydraulic fluid flow out of the second chamber.

16. The damping control method of claim 15 further comprising maintaining the second valve fully open when the position is not between (a) the second reference position within the second chamber and (b) the second end stop of the damping chamber that defines a boundary of the second chamber.

17. The damping control method of claim 15 further comprising maintaining the first valve fully open when the position is not between (a) the first reference position within the first chamber and (b) the first end stop of the damping chamber.

18. The damping control method of claim 15 further comprising, when the position is between (a) the first reference position within the first chamber and (b) the first end stop of the damping chamber:

determining a command for closing of the first valve based on the position; and selectively closing the first valve based on the command.

19. The damping control method of claim 18 further comprising the command based on the position and the first reference position.

20. A damping control method comprising:
selectively closing a first valve when a position of a plunger is between (a) a first reference position within a first chamber and (b) a first end stop of a damping chamber that defines a boundary of the first chamber;
the damping chamber connected to one of (a) a body of a vehicle and (b) a wheel of the vehicle;
a piston being slidably disposed within the damping chamber and including:
a piston rod that is connected to the other one of (a) the body of the vehicle and (b) the wheel of the vehicle; and
the plunger, the plunger connected to the piston rod and dividing the damping chamber into a first chamber and a second chamber; and
the first valve regulating hydraulic fluid flow out of the first chamber; and
when the position is between (a) the first reference position within the first chamber and (b) the first end stop of the damping chamber:
determining a command for closing of the first valve based on the position; and
selectively closing the first valve based on the command.

* * * * *